UNITED STATES PATENT OFFICE.

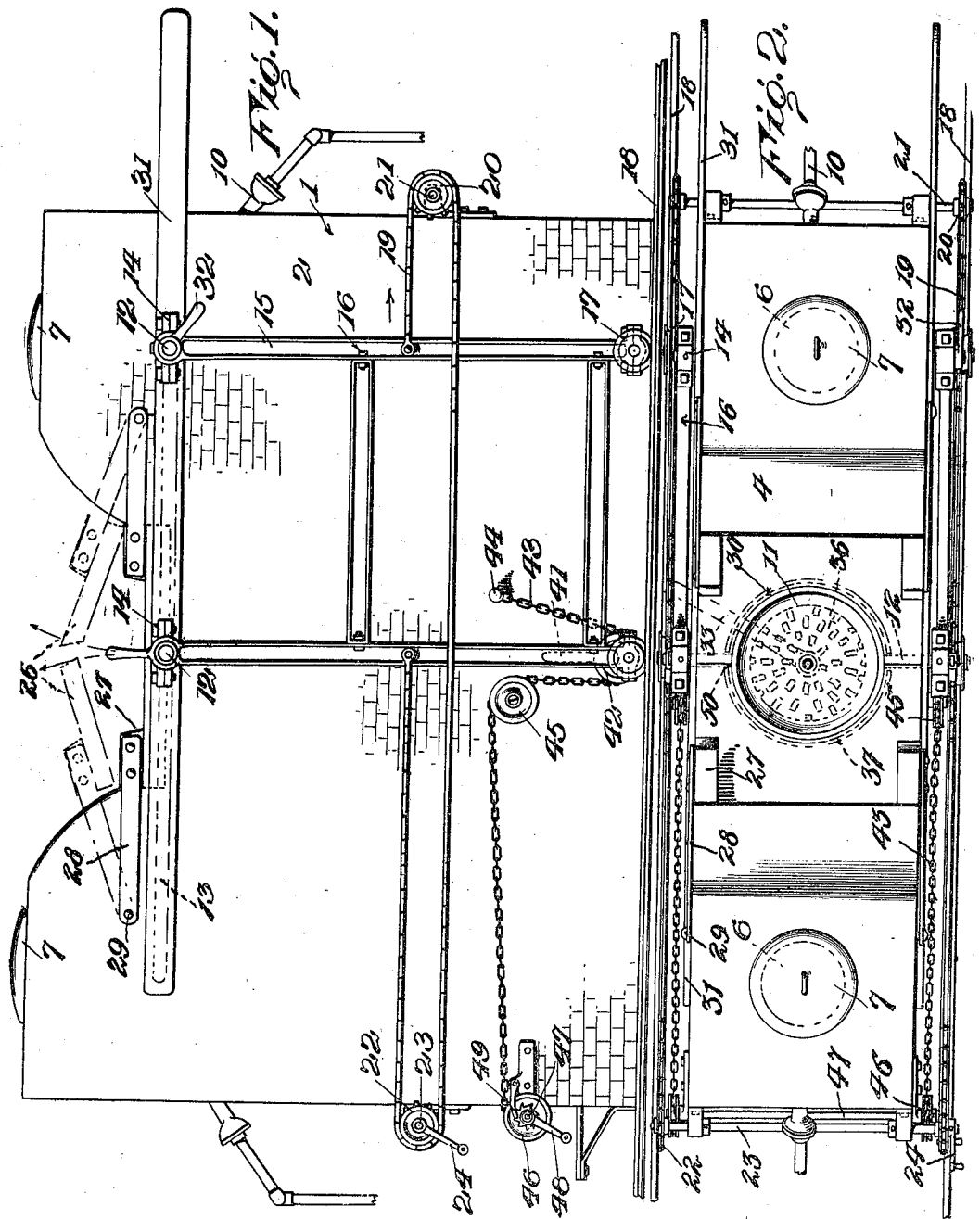

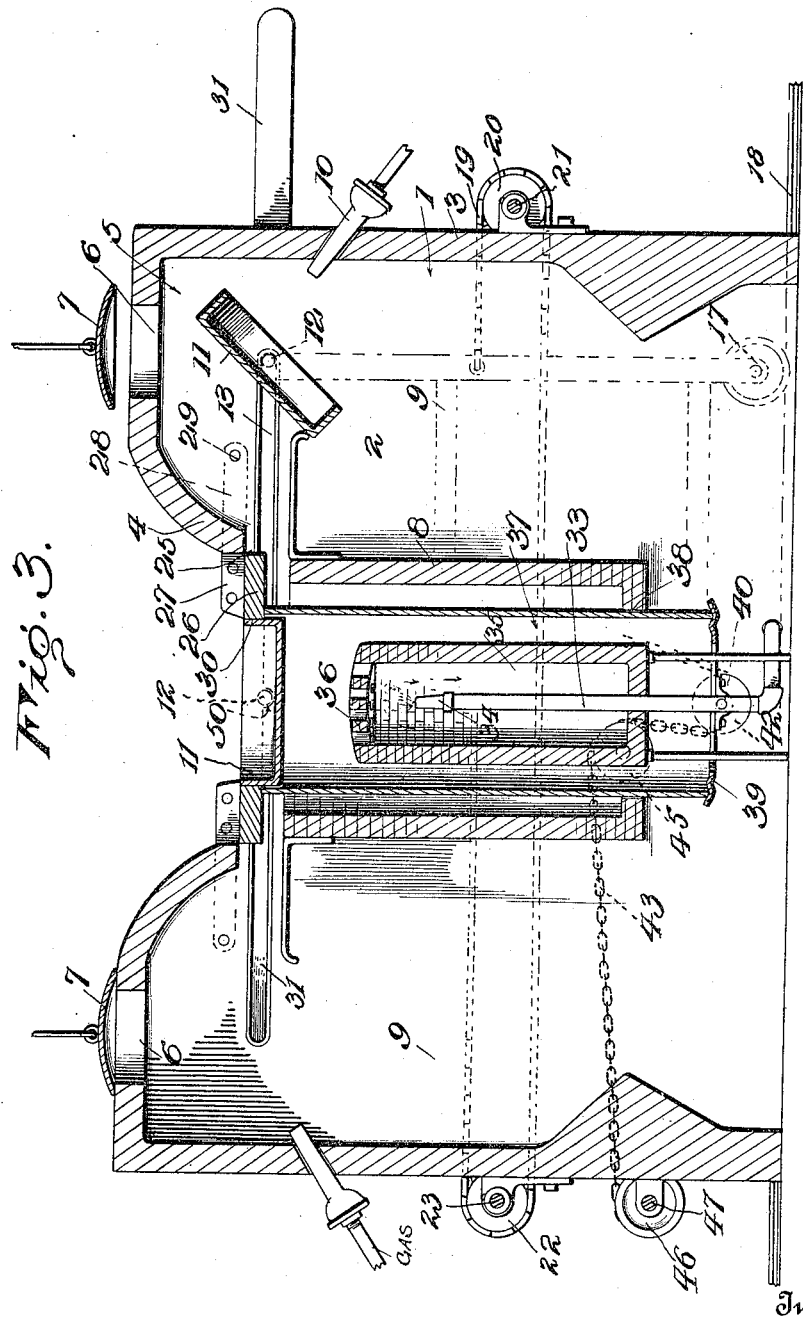

ROBERT W. HILTON, OF SMETHPORT, PENNSYLVANIA.

GLASS APPARATUS.

1,309,199.  Specification of Letters Patent.  Patented July 8, 1919.

Application filed September 9, 1918. Serial No. 253,305.
::::

*To all whom it may concern:*

Be it known that I, ROBERT W. HILTON, a citizen of the United States, residing at Smethport, in the county of McKean and State of Pennsylvania, have invented certain new and useful Improvements in Glass Apparatus, of which the following is a specification.

This invention relates to glass apparatus and more particularly to an improvement in glass furnaces and the means for supporting the drawing pots therein and for shifting the pots into and out of position for the carrying out of the drawing operation.

The primary object of the present invention is to provide in a glass furnace, novel means for supporting the drawing pots and for shifting the pots, by the utilization of which means the drawing operation may be carried out more expeditiously than has heretofore been possible, the pot supporting and shifting means being so constructed and operating in such a manner that when one pot is in position for the drawing of the cylinder, another pot will be in position for draining so that it is unnecessary to interrupt the drawing operation during the period of draining of the drawing pots, thus saving considerable time and greatly increasing production.

In the draining of the pots it is essential that a blast of flame be directed against the pots while they are in draining position so that all of the glass remaining in the pot will be melted and the pot thus completely drained. Also the pot which is in position for the carrying out of the drawing operation must be kept at a relatively high degree of temperature, but it is undesirable to expose any portion of the cylinder being drawn to extraneous heat at a higher degree of temperature than that to which any other portion of the cylinder is exposed, for if the heat is uneven, the wall of the cylinder will be of varying thickness and the product will be of inferior quality. Therefore, while the present invention contemplates the provision of means for directing a blast of flame against the pot being drained, it also contemplates the provision of a novel means for preventing heat from this blast of flame reaching the cylinder being drawn and thus exposing one side of the cylinder to heat at a higher degree of temperature than the other side. In this connection the invention contemplates the provision of a cylindrical damper housing the burner for heating the pot from which the glass cylinder is to be drawn, and adapted to be raised and lowered so that when raised its upper portion will surround or encompass the pot and thus protect the same from the blast of flame being directed against the pot which is in draining position.

Another object of the invention is to provide means for moving the pots along a horizontal line within the furnace so that by a direct horizontal shifting of the pots, they may be alternately brought into position for the carrying out of the drawing operation and into position for draining.

In the accompanying drawings:

Figure 1 is a side elevation of the apparatus embodying the present invention;

Fig. 2 is a top plan view thereof;

Fig. 3 is a vertical longitudinal sectional view through the apparatus.

In the drawings the furnace is indicated in general by the numeral 1 and the same includes side walls 2, end walls 3, and a top 4 which is closed except as will be presently explained. The top 4 of the furnace has its intermediate portion located in a plane considerably below the end portions so that domes 5 are provided at the top of the furnace at each end thereof, and each of these domes is formed with an opening 6 for the escape of gases and heated air currents from the blast of flame which is directed against a draining pot. Suitable dampers 7 may be provided and adjusted in any suitable manner to cover or expose the respective openings 6 as shown in Fig. 3 of the drawings. A partition wall 8 which is preferably cylindrical and of refractory brick, interiorly divides the furnace into chambers 9 located at the ends thereof and of which chambers the domes 5 constitute the tops. In order that the surplus glass left in the pots after the drawing operation may be melted while the pots are in tilted or draining position, a gas burner of any suitable type, indicated by the numeral 10, is fitted through each end wall 3 of the furnace and this burner is directed upwardly toward the interior of the respective dome 5 and preferably at an angle of approximately 45°.

While through various means the drawing pots of the apparatus may be shifted into and out of position for the carrying out of the drawing operation, it is preferable that the means illustrated in the drawings and which will now be described, be employed for this purpose. In the drawings the drawing pots are indicated by the numeral 11 and these pots are of any suitable material and any desired dimensions. Ordinarily the pots are of circular form and each pot is provided at diametrically opposite points with radial trunnions 12 which fit slidably through slots 13 formed in the side walls 2 of the furnace, these slots extending horizontally immediately below the open intermediate portion of the top of the furnace and terminating short of the end walls of the said furnace. The trunnions 12 are rotatably fitted in suitable bearings 14 carried at the upper corners of the frames 15 of trucks which are indicated in general by the numeral 16 and which are supported for travel by wheels 17 resting upon rails 18 extending exteriorly of the furnace and at the opposite sides thereof, it being understood that one of the trucks 16 is located at each side of the said furnace and that the trucks are movable in unison as the trunnions of the two pots are journaled in the corresponding bearings 14 of the trucks. In order that the trucks may be moved backwardly and forwardly upon the rails 18 and for the purpose of shifting the pots into and out of position for the carrying out of the drawing operation, sprocket chains 19 are connected each at one end to the forward side of the respective truck and each at its other end at the rear side of the respective truck, the chains intermediate their ends being passed over idle sprocket gears 20 upon a shaft 21 at the rear end of the apparatus and being also passed about sprocket gears 22 fixed upon a shaft 23 journaled at the forward end of the furnace and adapted to be rotated through the medium of a crank handle 24. Thus when the crank handle is rotated in one direction, the trucks will be moved toward the rear end of the furnace carrying with them the pots so that one pot will be brought to draining position and the other to position for the carrying out of the drawing operation, and when the crank handle is rotated in the opposite direction, the trucks and the pots carried thereby will be shifted toward the front of the apparatus.

The depressed intermediate portion of the top of the furnace is open as indicated by the numeral 25, but is to be partly closed by the sections 26 of a lid, which sections are provided upon their upper sides with bosses 27 which overhang the lateral edges of the sections and rest upon the upper edges of the side walls of the furnace when the lid sections are in lowered or closed position so as to support the said sections in the positions shown in Fig. 3 of the drawings. Arms 28 are secured to the outer sides of the bosses 27, and at their extremities are pivotally or hingedly connected as at 29 with the side walls of the furnace so that the sections of the lid may be swung upwardly a greater or less distance as indicated in dotted lines in Fig. 1 of the drawings or may be swung down to assume the full line position shown in the several figures. The lid sections 26 are so formed that when they are in lowered position they will match to provide an opening 30 of a diameter to more or less snugly receive the upper portion of the pot which is in position for the drawing of the cylinder. Of course, before shifting the pots, it will be necessary to swing the lid sections 26 upwardly so that they will clear the wall of the pot which they have previously surrounded. This swinging of the lid sections may be accomplished directly manually or by any suitable arrangement of devices adapted to be manipulated for the purpose.

In order to close the slots 13 in the side walls of the furnace and thus retain the heat within the furnace, closure plates 31 are carried by the upper ends of the frames 16 and extend forwardly and rearwardly beyond the frames and beside the outer faces of the side walls of the furnace so as to completely cover the slots in all positions of adjustment of the trucks.

In order to provide for tilting of the pots to draining and horizontal positions, any suitable means may be employed, and in the drawings hand levers 32 are secured to the trunnions 12 for the pots and may be grasped and swung for the purpose stated.

The numeral 33 indicates a fuel supply pipe provided at its upper end with a burner nozzle 34, and this pipe leads upwardly through the bottom of a housing 35 preferably cylindrical and built up of refractory brick, the housing at its top being of open construction or reticulated, as indicated by the numeral 36, so that the flame from the burner 34 will be distributed evenly against the under side of the pot from which glass is being drawn and which pot occupies a position within the opening 30 of the lid 26. While it is preferable that the housing 35 be provided for the burner pipe for the purpose stated, nevertheless if found desirable, this housing may be dispensed with.

As heretofore stated, it is desirable to maintain the glass within the pot from which the cylinder is being drawn at a substantially constant temperature and in order that this may be accomplished, a damper device is provided as will now be described. This damper is indicated in general by the numeral 37 and the same comprises a hollow cylindrical sheet metal body fitted for vertical sliding movement through an opening 38 formed in the bottom of the partition 8 and said damper surrounds and completely incloses the housing 35 for the burner 34 and at its lower end rests upon an annular head 39 provided at diametrically opposite points with trunnions 40 which are fitted through slots 41 formed in the side walls of the furnace, the slots extending vertically so that the trunnions may have vertical movement therein for the purpose of raising and lowering the head 39 to correspondingly raise and lower the damper 37. Idle pulleys 42 are fitted upon the trunnions 40 exteriorly of the furnace, and chains or other flexible elements 43 are permanently fixed each at one end as at 44 to the respective side wall of the furnace and are passed beneath the idle pulleys 42 and over other idle pulleys 45 mounted at fixed points upon the outer faces of the said side walls 2. The chains or other flexible elements are connected at their other ends to drums 46 secured upon the ends of a shaft 47 mounted in suitable bearings upon the forward end of the furnace. A crank handle 48 is fixed upon the end of the shaft 47 and through this medium the shaft may be rotated to wind the chains upon the drums 46 or to slacken the chains so as in the former instance to elevate the trunnions and the heads 39 from which they extend, thus elevating the damper 37, and in the latter instance to lower the said damper. A suitable pawl and ratchet device 49 may be provided in connection with the shaft 47 whereby to hold the same against backward rotation. When the damper 37 is elevated, its upper end will encompass and completely inclose the bottom portion of the pot which is in position for the drawing of the cylinder, and in order that the damper will not interfere with the bearing trunnions for this pot, the upper edge of the wall of the damper is formed at diametrically opposite points with notches 50 designed to receive the trunnions when the damper is elevated, the said upper edge of the wall of the damper in other respects engaging against the under surface of the sections 26 of the lid so as to completely exclude heat from the burners 10 and at the same time close in and retain the heat given off from the burner nozzle 34.

If desired the damper 37 may be formed of certain kinds of clay or other refractory material and in practice the upper end of this damper will preferably be spaced a sufficient distance from the pot 11 to permit free sliding movement between the parts and also to allow the heat to pass upwardly between the inner walls of the damper and the outer side wall of the pot and beneath the lid 26 as well as directly against the bottom of the pot, thus causing a uniform heating of the contents of the pot and consequently producing a uniform thickness of glass.

Having thus described the invention, what is claimed as new is:

1. In glass apparatus, a furnace having a drawing opening and a draining chamber, drawing pots, and means supporting the pots and operable to shift the pots along a substantially horizontal straight line alternately to position within the drawing opening and to position within the draining chamber.

2. In glass apparatus, in combination, a furnace having a drawing opening and draining chambers located at opposite sides of the drawing opening, and means for supporting drawing pots within the furnace and operable to alternately shift the pots along a horizontal straight line into position opposite the drawing opening and to position within the respective draining chamber.

3. In glass apparatus, in combination, a furnace having a drawing opening and draining chambers at opposite sides of the said opening, means for supporting drawing pots in spaced relation within the furnace and substantially horizontally alined, and means for actuating the supporting means to selectively move the pots along a straight horizontal line into drawing position and into position within the respective draining chambers.

4. In glass apparatus, in combination, a furnace having a drawing opening and draining chambers at opposite sides of the drawing opening, pot supporting means movable longitudinally of the furnace substantially in a horizontal line with the drawing opening, spaced drawing pots supported by the said means and tiltably mounted, and means for actuating the supporting means to shift the pots selectively into position opposite the drawing opening and to position within the respective draining chambers.

5. In glass apparatus, in combination, a furnace having a drawing opening and draining chambers at opposite sides of the drawing opening, pot supporting means movable longitudinally of the furnace substantially in a horizontal line with the drawing opening, spaced drawing pots supported by the said means and tiltably mounted, and means for actuating the supporting means to shift the pots selectively into position opposite the drawing opening and to position within the respective draining chambers, each draining chamber having a dome extending above the plane of the drawing opening whereby to permit of tilting of the respective pot to draining position.

6. In glass apparatus, a furnace having a drawing opening and draining chambers at opposite sides of the drawing opening, the side walls of the furnace being formed with slots extending substantially horizontally and approximately in the plane of the drawing opening, drawing pots having trunnions fitting slidably through the slots, and means located exteriorly of the furnace and including bearings for the trunnions and movable to shift the pots to bring the same selectively to position within the drawing opening and to position within the respective draining chambers.

7. In glass apparatus, a furnace having a drawing opening and draining chambers located at opposite sides of the drawing opening, the side walls of the furnace being provided with slots extending substantially horizontally, drawing pots having trunnions slidably fitting through the slots, trucks supported for travel exteriorly of the furnace at the opposite sides thereof and having bearings for the said trunnions, and means for shifting the trucks longitudinally of the furnace whereby to shift the pots selectively into position opposite the drawing opening and into position within the respective draining chambers.

8. In glass apparatus, a furnace having a drawing opening and draining chambers located at opposite sides of the drawing opening, the side walls of the furnace being provided with slots extending substantially horizontally, drawing pots having trunnions slidably fitting through the slots, trucks supported for travel exteriorly of the furnace at the opposite sides thereof and having bearings for the said trunnions, flexible elements connected at their ends with the trucks, shafts at the ends of the furnace, gear elements upon the shafts about which the flexible elements are trained, and means for rotating one of said shafts whereby to impart travel to the said trucks for the purpose of selectively shifting the pots into position opposite the drawing opening and into position within the respective draining chambers.

9. In glass apparatus, a furnace provided in its top with a drawing opening and provided interiorly at opposite sides of its drawing opening with draining chambers each having a dome extending above that portion of the top in which the drawing opening is provided, burners fitted through the end walls of the furnace and arranged to discharge their flame jets upwardly in the direction of the interior of the respective domes, drawing pots, and means for supporting the drawing pots for tilting movement and for movement longitudinally within the furnace to position opposite the drawing opening and to position within the domes of the respective draining chambers.

10. In glass apparatus, a furnace provided in its top with a drawing opening and provided interiorly at opposite sides of its drawing opening with draining chambers each having a dome extending above that portion of the top in which the drawing opening is provided, burners fitted through the end walls of the furnace and arranged to discharge their flame jets upwardly in the direction of the interior of the respective domes, drawing pots, means for supporting the drawing pots for tilting movement and for movement longitudinally within the furnace to position opposite the drawing opening and to position within the domes of the respective draining chambers, and means for excluding heat from the burners, from the vicinity of either drawing pot occupying the drawing position.

11. In glass apparatus, a furnace provided in its top with a drawing opening and provided interiorly at opposite sides of its drawing opening with draining chambers each having a dome extending above that portion of the top in which the drawing opening is provided, burners fitted through the end walls of the furnace and arranged to discharge their flame jets upwardly in the direction of the interior of the respective domes, drawing pots, means for supporting the drawing pots for tilting movement and for movement longitudinally within the furnace to position opposite the drawing opening and to position within the domes of the respective draining chambers, and a damper for excluding heat from the burners from either pot occupying the drawing position.

12. In glass apparatus, a furnace provided in its top with a drawing opening and at opposite sides of the drawing opening being provided interiorly with draining chambers, a burner within each draining chamber for directing flame against a pot in draining position within the chamber, drawing pots, means for supporting the pots and operable to shift the pots into position within the drawing opening and into position within the respective draining chambers, and a damper within the furnace between the said chambers movable to position to surround either drawing pot when in drawing position whereby to exclude heat from the burners.

13. In glass apparatus, a furnace provided in its top with a drawing opening and at opposite sides of the drawing opening being provided interiorly with draining chambers, a burner within each draining chamber for directing flame against a pot in draining position within the chamber, drawing pots, means for supporting the pots and operable to shift the pots into position within the drawing opening and into position within the respective draining chambers, and a cylindrical damper vertically movably supported within the furnace between the chambers and arranged in elevated position to surround either pot when in drawing position.

14. In glass apparatus, a furnace provided in its top with a drawing opening and at opposite sides of the drawing opening being provided interiorly with draining chambers, a burner within each draining chamber for directing flame against a pot in draining position within the chamber, drawing pots, means for supporting the pots and operable to shift the pots into position within the drawing opening and into position within the respective draining chambers, a cylindrical damper vertically movably supported within the furnace between the chambers and arranged in elevated position to surround either pot when in drawing position, and means operable from the exterior of the furnace to vertically adjust the said damper.

15. In glass apparatus, a furnace provided in its top with a drawing opening and provided interiorly at opposite sides of the drawing opening with draining chambers, a burner within each chamber for discharging flame against a pot in draining position within the chamber, drawing pots within the furnace, means for supporting the pots and operable to shift the pots selectively into position within the drawing opening and into position within the respective draining chambers, the furnace having a chamber located between the draining chambers, a burner within the last-mentioned chamber beneath the drawing opening, and a damper surrounding the last-mentioned burner and vertically movable and arranged in elevated position to surround either pot when in position within the drawing opening.

16. In glass apparatus, a furnace provided in its top with a drawing opening and provided interiorly at opposite sides of the drawing opening with draining chambers, a burner within each chamber for discharging flame against a pot in draining position within the chamber, drawing pots within the furnace, means for supporting the pots and operable to shift the pots selectively into position within the drawing opening and into position within the respective draining chambers, the furnace having a chamber located between the draining chambers, a burner within the last-mentioned chamber beneath the drawing opening, a damper surrounding the last-mentioned burner and vertically movable and arranged in elevated position to surround either pot when in position within the drawing opening, and means for vertically adjusting the said damper.

17. In glass apparatus, a furnace provided in its top with a drawing opening and provided interiorly at opposite sides of the drawing opening with draining chambers, a burner within each chamber for discharging flame against a pot in draining position within the chamber, drawing pots within the furnace, means for supporting the pots and operable to shift the pots selectively into position within the drawing opening and into position within the respective draining chambers, the furnace having a chamber located between the draining chambers, a burner within the last-mentioned chamber beneath the drawing opening, and a cylindrical damper vertically movable within the last mentioned chamber and surrounding the last-mentioned burner and arranged when in elevated position to surround either pot in position within the drawing opening whereby to exclude from the vicinity of the pot heat from the first mentioned burners.

18. In glass apparatus, a furnace provided in its top with a drawing opening and provided interiorly at opposite sides of the drawing opening with draining chambers, a burner within each chamber for discharging flame against a pot in draining position within the chamber, drawing pots within the furnace, means for supporting the pots and operable to shift the pots selectively into position within the drawing opening and into position within the respective draining chambers, the furnace having a chamber located between the draining chambers, a burner within the last-mentioned chamber beneath the drawing opening, a supporting member vertically adjustable within the furnace, means operable from the exterior of the furnace for adjusting the said member, and a cylindrical damper supported by the member and vertically movable therewith within the last mentioned chamber and surrounding the last mentioned burner and arranged when in elevated position to surround either pot when in position within the drawing opening.

19. In glass apparatus, a furnace provided in its top with a drawing opening and provided interiorly at opposite sides of the drawing opening with draining chambers, a burner within each chamber for discharging flame against a pot in draining position within the chamber, drawing pots within the furnace, means for supporting the pots and operable to shift the pots selectively into position within the drawing opening and into position within the respective draining chambers, the furnace having a chamber located between the draining chambers, a burner within the last-mentioned chamber beneath the drawing opening, an annular head within the furnace, trunnions carried by the head and extending through the side walls of the furnace, idle pulleys carried by the trunnions and upon the side walls of the furnace, a shaft, drums upon the shaft, means for rotating the shaft, flexible elements connected with the drums and with the side walls of the furnace and trained over the idle pulleys whereby when the said elements are wound upon the drums the supporting member will be elevated, and a cylindrical damper carried by the supporting member and movable vertically within the last-mentioned chamber and surrounding the last-mentioned burner and arranged in elevated position to surround either pot when in position within the drawing opening.

20. In glass apparatus, a furnace having an opening in its top and provided interiorly at opposite sides of the opening with draining chambers, lid sections mounted for swinging movement upon the furnace and arranged when in lowered position to match within the said opening and to provide between them a drawing opening, drawing pots, and means for supporting the pots for movement in the furnace into position within the drawing opening surrounded by the sections of the lid and into position within the respective draining chambers.

21. In glass apparatus, a furnace having an opening in its top and provided interiorly at opposite sides of the opening with draining chambers, lid sections mounted for swinging movement upon the furnace and arranged when in lowered position to match within the said opening and to provide between them a drawing opening, drawing pots, means for supporting the pots for movement in the furnace into position within the drawing opening surrounded by the sections of the lid and into position within the respective draining chambers, and a damper within the furnace movable to position to surround either pot when in drawing position and coöperating with the underside of the lid sections to exclude heat from the vicinity of the pot.

22. In glass apparatus, a furnace provided in its top with a drawing opening and provided interiorly with a draining chamber, a burner fitted through the end wall of the furnace and arranged to discharge its flame upwardly in the direction of the top of the draining chamber, drawing pots, means for supporting the pots and for moving the same successively into position beneath the drawing opening and to position within the draining chamber in which latter position the pot occupying the same will be subjected to the heat from the burner, and a damper for inclosing either pot when in the drawing position.

23. In glass apparatus, a furnace provided in its top with a drawing opening and provided interiorly with a draining chamber, a burner fitted through the end wall of the furnace and arranged to discharge its flame upwardly in the direction of the top of the draining chamber, drawing pots, means for supporting the pots and for moving the same successively into position beneath the drawing opening and to position within the draining chamber in which latter position the pot occupying the same will be subjected to the heat from the burner, a cylindrical damper vertically movably supported within the furnace and arranged in elevated position to surround either pot when in drawing position, and means operable from the exterior of the furnace to vertically adjust the said damper.

In testimony whereof I affix my signature.

ROBERT W. HILTON. [L. S.]